(12) United States Patent
Adams et al.

(10) Patent No.: US 10,394,623 B2
(45) Date of Patent: Aug. 27, 2019

(54) TECHNIQUES FOR PROCESSING CUSTOM EVENTS

(71) Applicant: INTEL CORPORATION, Santa Clara, CA (US)

(72) Inventors: Nicholas Adams, Beaverton, OR (US); Saiprasad Paithara Balagangadhara, Folsom, CA (US); Pronay Dutta, Beaverton, OR (US); Rajeev K. Nalawadi, El Dorado Hills, CA (US); Vinay K. Rangineni, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 399 days.

(21) Appl. No.: 15/026,137

(22) PCT Filed: Nov. 14, 2013

(86) PCT No.: PCT/US2013/070004
§ 371 (c)(1),
(2) Date: Mar. 30, 2016

(87) PCT Pub. No.: WO2015/072992
PCT Pub. Date: May 21, 2015

(65) Prior Publication Data
US 2016/0253222 A1 Sep. 1, 2016

(51) Int. Cl.
*G06F 13/24* (2006.01)
*G06F 9/54* (2006.01)
(Continued)

(52) U.S. Cl.
CPC ........... *G06F 9/542* (2013.01); *G06F 1/32* (2013.01); *G06F 1/3287* (2013.01); *G06F 3/038* (2013.01);
(Continued)

(58) Field of Classification Search
None
See application file for complete search history.

(56) References Cited

U.S. PATENT DOCUMENTS 5,905,900 A * 5/1999 Combs ............... G06F 1/3203
713/320
2003/0131169 A1 7/2003 Cooper
(Continued)

FOREIGN PATENT DOCUMENTS

WO 2013162523 A1 10/2013

OTHER PUBLICATIONS

Extended European Search Report received for European Patent Application No. 13897514.9, dated Mar. 29, 2017, 9 pages.
(Continued)

*Primary Examiner* — Henry Tsai
*Assistant Examiner* — Dean Phan

(57) ABSTRACT

Various embodiments are generally directed an apparatus and method for receiving an interrupt to cause a system event on a platform processing device from a device not operative to directly cause the system event on the platform processing device, generating a generic event 5 message having information based on the interrupt and in response to receiving the interrupt. Moreover a defined event message may be generated having information based on the information in the generic event message and interrupt may be sent to an operating system of the platform processing device to cause the system event on the platform processing device based on information in the defined event message.

20 Claims, 7 Drawing Sheets

(51) Int. Cl.
*G06F 9/48* (2006.01)
*G06F 1/32* (2019.01)
*G06F 1/3287* (2019.01)
*G06F 3/038* (2013.01)

(52) U.S. Cl.
CPC ............ *G06F 9/4812* (2013.01); *G06F 13/24* (2013.01); *Y02D 10/171* (2018.01); *Y02D 10/24* (2018.01); *Y02D 50/20* (2018.01)

(56) References Cited

U.S. PATENT DOCUMENTS

| | | |
|---|---|---|
| 2004/0088460 A1 | 5/2004 | Poisner |
| 2005/0182977 A1 | 8/2005 | Powers et al. |
| 2007/0162582 A1 | 7/2007 | Belali et al. |
| 2008/0148033 A1 | 6/2008 | Sumner et al. |
| 2009/0055665 A1 | 2/2009 | Maglione et al. |
| 2014/0269474 A1* | 9/2014 | Zhu .................. H04W 52/0216 370/311 |

OTHER PUBLICATIONS

Anil, Seth, "What Makes Netbook Hotkeys Tick!—Over the Years", retrieved at <http://start.sethanil.com/exploring-software/9>, Nov. 1, 2010, 2 pages.

International Search Report dated Aug. 19, 2014 in International Patent Application No. PCT/US2013/070004.

* cited by examiner

400

RECEIVE AN INTERRUPT TO CAUSE AN EVENT ON A PLATFORM PROCESSING DEVICE FROM A DEVICE NOT OPERATIVE TO DIRECTLY CAUSE THE EVENT ON THE PLATFORM PROCESSING DEVICE
405

GENERATE A GENERIC EVENT MESSAGE HAVING INFORMATION BASED ON THE INTERRUPT AND IN RESPONSE TO RECEIVING THE INTERRUPT
410

GENERATE A DEFINED EVENT MESSAGE HAVING INFORMATION BASED ON THE INFORMATION IN THE GENERIC EVENT MESSAGE
415

INTERRUPTING AN OPERATING SYSTEM OF THE PLATFORM PROCESSING DEVICE TO CAUSE THE EVENT ON THE PLATFORM PROCESSING DEVICE BASED ON INFORMATION IN THE DEFINED EVENT MESSAGE
420

*FIG. 4*

TECHNIQUES FOR PROCESSING CUSTOM EVENTS

TECHNICAL FIELD

Embodiments described herein generally relate to processing custom events and invoking system events on a computing system.

BACKGROUND

System events, such as transitions between operating states is typically controlled and coordinated by an operating system and its associated software, such as power management software. More specifically, the operating system tightly controls which events can and cannot invoke a transition between various operating states of the computing system. In some instances, these events must be known and defined when the computing system launches and are controlled by the computing system manufacture and operating system developer. However, this tight control over which events may or may not cause transitions between operating states limits other device manufacture's ability to develop devices that invoke or cause a transition between operating states after the operating system has launched.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates a second flow diagram to process a custom event.

DETAILED DESCRIPTION

Figure 1:
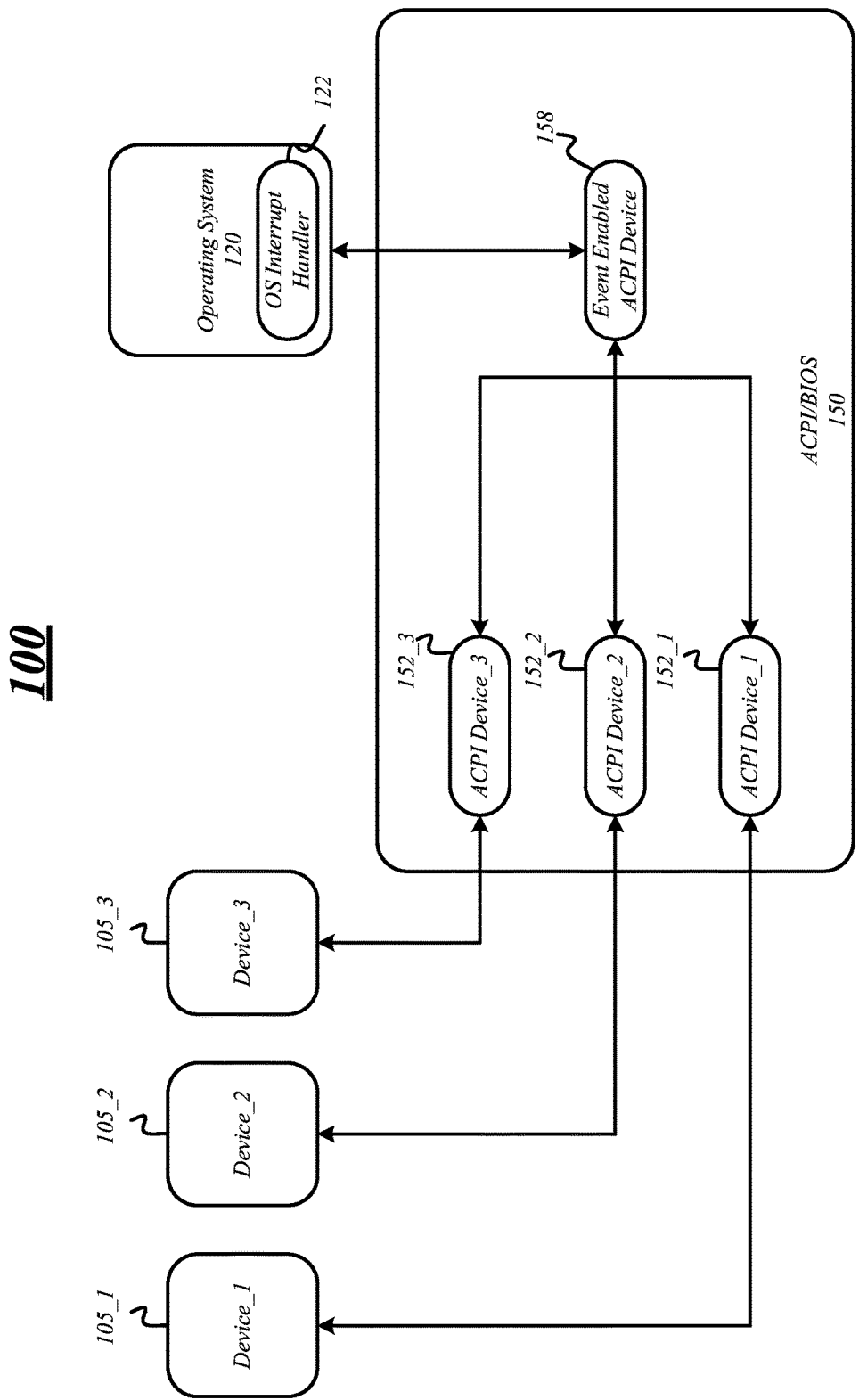
FIG. 1 illustrates a first exemplary embodiment of a computing system.

Various embodiments are generally directed to devices, developed before or after the launch of a computing system, detecting or receiving a custom event to invoke a system event such as a transition between operating states. In some embodiments, these devices may not be directly operative to invoke the system event. However, various embodiments provide the devices the capability to invoke the system event by utilizing other devices that are capable of directly invoking the system event.

The devices directly capable of invoking the system event may be advanced configuration and power interface (ACPI) devices or any other device configuration and power management system of a basic input/output system (BIOS). For example, an ACPI device may be a power control button, a sleep control button or a human interface device (HID) that has the capability to directly communicate with the operating system and power management software to invoke system events and cause transitions between power states.

In various embodiments, a device receiving or detecting the custom events may attach to or associate with a virtual (ACPI) device to allow the device to communicate with an ACPI device capable of invoking system events. More specifically, the virtual ACPI device may provide a gateway to the device receiving or detecting the custom event to communicate that a system event is desired. In one example, the device may communicate via one or more messages or an interrupt that a specific system event, such as a transition between a lower power state and an active working state is desired, or vice versa. The attached ACPI device may receive the message and/or interrupt and generate a message or interrupt to communicate the system event to an ACPI device capable of directly invoking the system event. The ACPI device capable of directly invoking the system event may generate an interrupt to call a function or method of the operating system to invoke the system event. The operating system may invoke the system event, such as transitioning a computing system from a lower power state to a normal operating state where a user may interface with the computing system. In another example, the operating system may transition a computing system into a lower power state to save battery life and power in response to receiving the interrupt from the ACPI device capable of directly invoking the system event. The purpose of this indirection is to make custom events that are not necessarily related to each other to be able to be bound with the purpose of using a known operating system functionality for a new usage model. These and other details will become more apparent in the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus.

Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of an exemplary computing system 100 or platform processing device including devices 105_1, 105_2 and 105_3. In various embodiments, computing system 100 may be any type of computing device including, but not limited to a workstation, a server computer, a personal computer, a portable computer, microprocessor-based entertainment appliance, a mobile device, and the like. FIG. 1 illustrates computing system 100 only having three devices. However, various embodiments are not limited in this manner and the computing system 100 may include any number of devices.

In various embodiments, devices 105_1, 105_2 and 105_3 may be any kind of device, sensor, interface, etc. to receive or detect a custom event. Devices 105_1, 105_2 and 105_3 may include, but are not limited to, a motion detection sensor, an accelerometer, a temperature sensor, a network interface device, a touch sensitive sensor, a microphone, a battery or power detection sensor, a light detection sensor, etc. The one or more devices 105 may receive or detect custom events, such as a temperature above or below a thermal threshold, a movement of the computing device 100, a contact with the computing device 100, a sound, a battery life of a battery below or above a battery level threshold, a connection with another device, a remote custom event message, ambience light below or above a light threshold, etc. The custom event may be any event detected by device 105.

For example, device 105 may be a thermal sensor and may detect the internal temperature of the computing system 100 above a defined thermal threshold. The device 105 may communicate information or data to that the temperature is above the thermal threshold and one or more messages may be generated and sent to instruct or initiate a sleep event or power down to a lower power state for the computing system 100 so that it does not overheat and damage system components. Alternatively, one or more messages may be generated and sent to instruct the computing system 100 to exit a lower power state such that fans or other cooling apparatuses are initiated to cool the computing device 100.

In another example, device 105 may be a motion detection sensor such as an accelerometer and may detect motion of the computing device 105 in a pattern or non-pattern form. Based upon the detected motion, the device 105 may communicate information or data to wake or power down the computing system 100. In various embodiments, one particular motion/pattern may be used to wake the computing device and another motion/pattern may be used to put the computing system 100 into the lower power state.

In a third example, the device 105 may be a network interface device and may receive information or data from a coupled device via one or more network connections (not shown) to put the computing device 100 into a lower power state or wake the computing system 100 from a lower power state.

In another example, device 105 may be a light sensor and may detect ambient light above or below a light threshold. More specifically, device 105 may detect that the ambient light around the computing device 105 has fallen below a defined light threshold indicating that a user has left a room and a light was turned off. The device 105 may send information to put the computing system 100 into a lower power state. Alternatively, the device 105 may detect that the ambient light is above a defined light threshold and information may be sent to wake the computing system 100.

Device 105 may be a battery level detection sensor and may detect a battery level above or below a battery level threshold, in another example. The device 105 may then send or communicate this information to wake or put the computing system 100 into a lower power state.

In another example, device 105 may be a microphone and may detect a sound, noise, instruction, verbal command, etc. The device 105 may send or communicate information to put the computing system 100 into a lower power state or wake the computing system 100 from a lower power state based on the detected sound and information from the device 105.

Moreover, the devices 105 may detect or receive a custom event to cause another event, such as a system event on the computing system 100. For example, the custom event may cause a system event such as transitioning the computing system 100 into a lower power state, or waking the computing system 100 from a lower power state. In some embodiments, the computing system 100 may return to a full or partial operating state including powering some or all of the components and devices. When in a lower power state, various components and devices of the computing system 100 may be turned off. The lower power state may be any low power state such as one of the low power states as defined by the ACPI specification.

As will be discussed with respect to FIG. 2, each device, 105_1, 105_2 and 105_3 may be associated with a device driver including an interrupt handling component. The device driver may include one or more components such as the interrupt handling component and typically communicates with the devices 105 through one or more interconnects such as a computer bus or communications subsystem to which the hardware of the devices 105 connects. In some embodiments, the device 105 may send data or information to the associated device driver to invoke one or more routines or functions via one or more components such as an interrupt handling component. For example, device 105 may detect or receive a custom event and then communicate information or data through one or more interconnects that the custom event has occurred to the associated device driver. The information or data may be communicated to the device driver via an interrupt to the interrupt handling component.

In response to receiving information or data that the custom event has occurred, the device driver may generate information and/or one or more messages to communicate to one or more other components of computing system 100 that a custom event has occurred and action is required. In various embodiments, the device driver may generate a generic event message having information indicating whether to transition the computing system to a lower power state or to wake the computing system from a lower power state. The generic event message may allow or enable a device manufacture to create new custom events to invoke or cause a particular action on a computing system or platform processing device after the device has been launched.

As will be discussed in more detail below, the device drivers associated with devices 105 may send or communicate the generic messages to an attached advanced configuration and power interface (ACPI) device 152. More specifically, the generic event messages may be in the form of an interrupt call to a method of an ACPI device driver associated ACPI device 152. For example, a generic event message may be an interrupt call to a wake method of the ACPI device driver or an interrupt call to a sleep method of the ACPI device driver of an ACPI device 152.

In various embodiments, computing system 100 may include a basic input/output system (BIOS 150) including advanced configuration and power interface (ACPI) devices 152_1, 152_2 and 152_3 and an event enabled ACPI device 158. Although FIG. 1 illustrates BIOS 150 having three ACPI devices 152 and one event enabled ACPI device 158, BIOS 150 may include any number of ACPI devices 152 and event enabled ACPI devices 158. The BIOS 150 may be an advanced configuration and power interface (ACPI) compliant basic input/output system. More specifically, BIOS 150 may be compliant with the ACPI Specification, Revision 5.0, published Dec. 6, 2011, ("the ACPI Specification") and/or earlier or later revisions. The ACPI specification defines computing system power states as "S-states" and these states are denoted in the ACPI specification as S0, S1, S2, S3, S4 and S5. In addition, the S-states may also include an S0 idle state and a connected standby state that delivers a low-latency connected idle state. In a common usage, these S-states are available for power management of a computing system. The S-states include three categories that are denoted in the ACPI specification as "working," "sleeping" and "soft off" states. The working state includes the S0 state, the sleeping state includes S0 idle, S1, S2, S3 and S4 states and the soft off state includes the S5 state. A transition between working, sleeping and soft off states for the computing system is typically controlled by an operating system's power management software. In various embodiments, BIOS 150 may be compliant with any version of the ACPI specification.

In some embodiments, each of the devices 105_1, 105_2, and 105_3 may load against or attach to an advanced configuration and power interface (ACPI) device such as ACPI devices 152_1, 152_2 and 152_3, respectively. The ACPI devices 152 may be virtual ACPI devices. The virtual ACPI devices may be defined in memory space of a memory and each of the devices 105 may each attach to a different one of the virtual ACPI devices 152. By attaching to the ACPI devices 152, the devices 105 may communicate with firmware including BIOS 150 or other hardware subsystems of computing system 100. For example, ACPI devices 152 may communicate with event enabled ACPI device 158 via firmware and one or more interconnects.

As previously discussed, devices 105 may detect a custom event and an associated device driver may generate a generic event message having information to transition the computing system 100 to a particular operating state. The device driver associated with device 105 may communicate the generic event message to a coupled ACPI device 152 for processing the message and enabling a particular action. In some embodiments, the device driver associated with device 105 may communicate the generic event message as an interrupt call to a method of an ACPI device driver of the ACPI device 152. In one example, the device driver associated with device 105 may call a wake method of a device driver associated with the ACPI device 152 to communicate a generic event message to wake the computing system 100. In another example, the device driver may call a sleep method of the device driver associated with the ACPI device 152 to communicate a generic event message to put the computing system 100 into a lower power state.

The device driver associated with the ACPI device 152 may receive the interrupt call for the generic event message from the device driver associated with device 105 and may process the generic event message. The ACPI device 152 including the ACPI device driver may generate a defined event message based on the generic event message. For example, the ACPI device driver may generate a defined event message having information indicating when a wake event is desired. In addition, the ACPI device driver may generate a defined event message having information indicating when a sleep event is desired. A wake event occurs when the computing system exits a lower power state and returns to a partial or fully operating state. A sleep event occurs when the computing system is put into a lower power state and one or more components are powered off. The defined event messages may be used to notify the event enabled ACPI device 158 of an action to invoke based on a custom event.

The event enabled ACPI device 158 may be any ACPI device capable of processing or directly causing an action or event to occur on the computing system 100 that the devices 105 are not directly operable to initiate or cause. More specifically, the event enabled ACPI device 158 may have defined actions that may programmed or determined when the computing system 100 is launched and loaded into BIOS 105.

In some embodiments, the event enabled ACPI device 158 may be a power button ACPI device, a sleep button ACPI device, and/or human interface (HID) device. A power button ACPI device, sleep button ACPI device and HID device may be associated with a device driver operable to generate information to cause an event to occur on the computing system 100. For example, the power button ACPI device may be operable to generate information to wake the computing system 100 from a lower power state or put the computing system 100 in a lower power state when a pressing or a depressing of a button is detected by the power button ACPI device and associated device driver. In another example, the sleep button ACPI device may operate in a similar manner as the power button ACPI device and generate information to wake the computing system 100 from a lower power state or put the computing system 100 in a lower power state based on a detected pressing or depressing of the sleep button ACPI device and associated device driver. In a third example, the HID device may be a keyboard that is capable of waking the computing system 100 from a lower power state or putting the computing system 100 into a lower power state based on a key that is pressed.

In various embodiments, the event enabled ACPI device 158 and associated device driver may initiate or generate interrupts based on information received from the ACPI devices 152 and ACPI device drivers. For example, the device 105 may detect a custom event such as a sensor threshold being exceeded and the event enabled ACPI device 158 may receive information from the ACPI device 152 and associated device drivers and generate an interrupt. The event enabled ACPI device 158 and associated device driver may be operable to cause a system event on the computing device 100 such as transitioning between power states based on a message received from an ACPI device 152 and associated device driver. The event enabled ACPI device driver may receive a defined event message from the ACPI device driver via one or more interconnects and firmware in the ACPI/BIOS. The event enabled ACPI device driver may process the defined event message to invoke a system event or action. More specifically, the event enabled ACPI device driver may generate an interrupt based on the defined event message and call an interrupt handler of the operating system. For example, if the defined event message is a defined wake event message, the event enabled ACPI device driver may generate an interrupt to wake the computing system 100. In another example, if the defined event message is a defined sleep event message, the event enabled ACPI device driver may generate an interrupt to put the computing system 100 into a lower power state.

In various embodiments, computing system 100 may include an operating system (OS) 120 including, but not limited to, Linux®, Windows®, Apple OS®, Android OS®, Berkeley Software Distribution (BSD)®, iOS®, QNX®, Windows Phone OS®, etc. In various embodiments, operating system 120 acts as an intermediary between programs and the computer hardware. The operating system 120 is generally a collection of software that manages computer hardware resources and provides common services for computer programs for the computing system 100.

Operating system 120 may include one or more interrupt handlers including interrupt handler 122 to handle interrupts generated by one or more components of BIOS 150 including, but not limited to, the event enabled ACPI device 158 and associated device driver. For example, interrupt handler 122 may receive an interrupt from the event enabled ACPI device's 158 device driver via one or more interconnects instructing or indicating the operating system 120 to exit or enter a lower power state. The interrupt handler 122 may then send information as one or more messages or signals to a processing circuitry indicating an event that needs immediate attention has occurred. The processing circuitry responds by suspending its current activities, saving its state, and handles the event by executing instructions to exit a lower power state or enter a lower power state for the computing device 100, for example.

Figure 2:
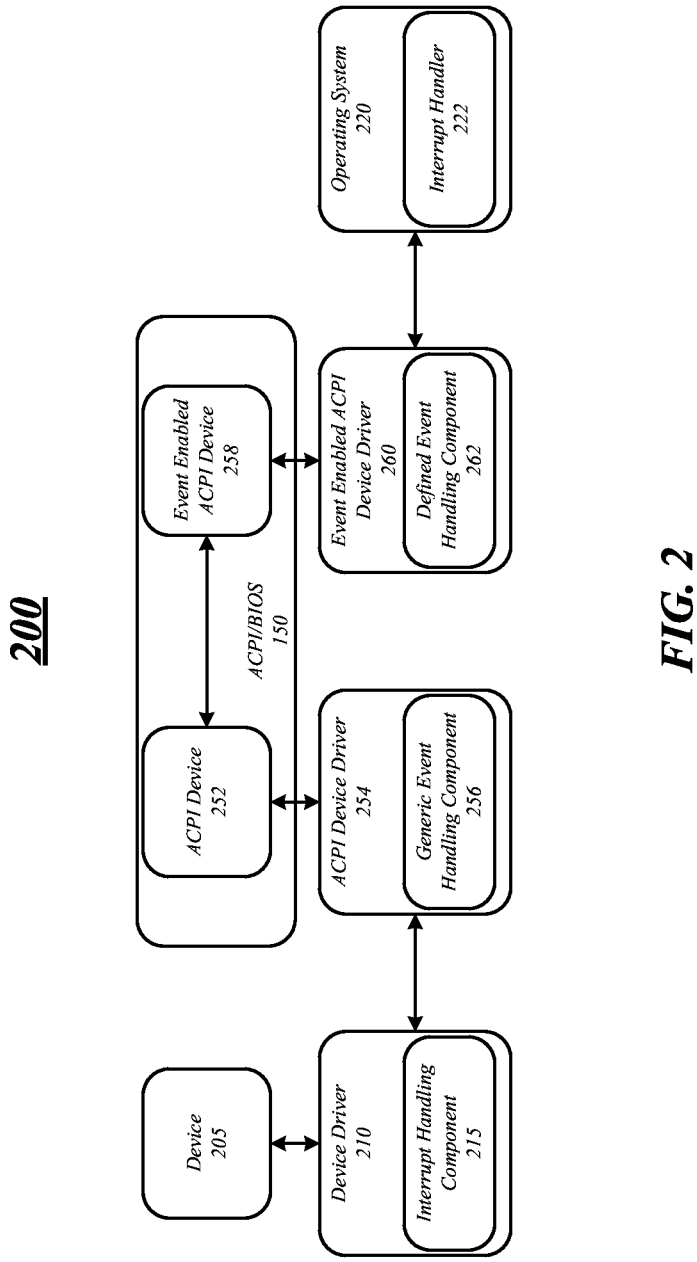
FIG. 2 illustrates a second exemplary embodiment of computing system.

FIG. 2 illustrates another exemplary computing system 200 or platform processing device. In various embodiments, computing system 200 may be the same as or similar to computing system 100 for processing custom events. Computing system 200 includes device 205 and associated device driver 210 having an interrupt handling component 215. Device 205 may be the same as or similar as one of devices 105_1, 105_2 and 105_3. Device driver 210 may communicated with device 205 through one or more interconnects such as a computer bus or communications subsystem. In some embodiments, the device driver 210 may issue commands to the device 205 and the device 205 may send data or information to device driver 210 to invoke one or more routines or functions. More specifically, the device 205 may detect one or more custom events and communicate information or data through one or more interconnects that the custom event has occurred to the device driver 210.

In some embodiments, the information or data may be communicated to the device driver 210 via an interrupt and the interrupt handling component 215 may process the received interrupt. More specifically, the interrupt handling component 215 may receive the interrupt from the device and may generate information and/or one or more messages to communicate to one or more other components of computing system 200 that a custom event has occurred and action is required. In various embodiments, the interrupt handling component 215 may generate a generic event message or notification including information indicating to wake the computing system 200 from a lower power state or to put computing system 200 into a lower power state. The generic event message may allow device 205 to invoke an action that it may not be directly operative to invoke.

The interrupt handling component 215 may send the generic event message or notification to a coupled generic event handling component 256 of an ACPI device driver 254. In various embodiments, the ACPI device driver 254 may be a device driver for an ACPI device 252. The generic event handling component 256 may receive the generic event message and generate a defined event message or notification. In various embodiments, the generic event handling component 256 may generate a defined event message having information indicating the custom event is to invoke a system event on such as transitioning the computing system 200 from a lower power state or into a lower power state based on information in the generic event message.

The generic event handling component 256 may send or communicate the defined event message to a defined event handling component 262 of an event enabled APCI device driver 260 to process the defined event message. The event enabled APCI device driver 260 may be a device driver for the event enabled ACPI device 258 operable to cause or initiate the system event to occur on the computing system 200. In various embodiments, the defined event message may be communicated directly between the generic event handling component and the defined event handling component or through one or more interconnects utilizing firmware in the ACPI/BIOS 150.

The defined event handling component 262 may receive the defined event message from the generic event handling component 262 and process the message. In particular, the defined event handling component 262 may generate in a system interrupt based on the defined event message. For example, the defined event handling component 262 may generate a system interrupt to wake the computing system 200 from a lower power state when the defined event message includes information indicating the computing system 200 is to exit a lower power state. In another example, the defined event handling component 262 may generate a system interrupt to put the computing system 200 into a lower power state when the defined event message includes information indicating the computing system 200 is to be put into a lower power state. The interrupt generated to wake the computing system 200 from a lower power state or put the computing system 200 into a lower power state may be the same interrupt generated when the event enabled ACPI device 258 detects an event itself. However, in this case, the interrupt is generated based on receiving the defined event message, not a detected event by the event enabled ACPI device 258.

Computing system 200 may include an operating system 220 having an interrupt handler 222 to receive and process the interrupts generated by the defined event handling component 262. In various embodiments, operating system 220 and interrupt handler 222 may be the same as operating system 120 and interrupt handler 122, respectively. The defined event handling component 262 may generate a system interrupt and call a method or function of the operating system 220 that is handled by interrupt handler 222. The system interrupt may be a call to a method or function to wake the computing system 200 from a lower power state or may be call to a method or function to put the computing system 200 into a lower power state.

The interrupt handler 222 may receive the call and process the call to cause the system event to occur. For example, the interrupt handler 222 may receive a call to a function to wake the computing system 200 from a lower power state and the interrupt handler 222 may process the call such that the computing system 200 exits the lower power state. In another example, the interrupt handler 222 may receive a call to a function to put the computing system 200 into a lower power state and the interrupt handler 22s may process the call such that the computing system 200 is put into the lower power state.

Figure 3:
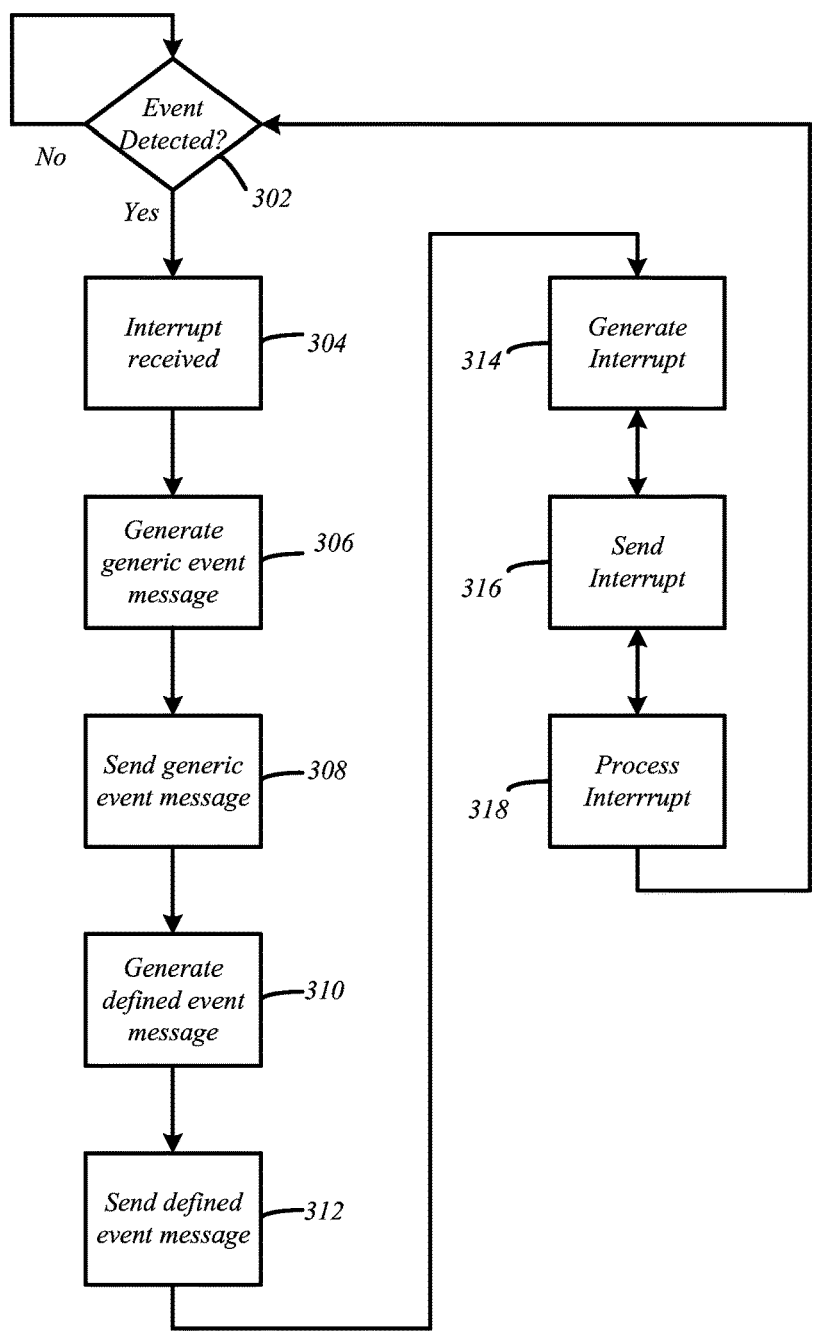
FIG. 3 illustrates a first flow diagram to process a custom event.

FIG. 3 illustrates a process flow diagram 300 for custom event processing. At decision block 302, one or more devices may determine if a custom event has occurred based on a detection of the event or information received over one or more interfaces. As previously discussed, a computing system or platform processing device such as systems 100 and 200 may include any number of devices to detect custom events. For example, systems 100 and 200 may include a temperature sensor which may determine or detect when a temperature for the computing system is above or below a predetermined threshold indicating that the computing system is too hot or is operating at a normal operating temperature. In another example, systems 100 and 200 may include a motion sensor such as an accelerometer to detect motion of the computing system. In a third example, systems 100 and 200 may include a network interface that may receive an instruction or custom event from a remote or coupled device via one or more connections.

If a custom event is detected, the device may generate and send an interrupt to a coupled or associated device driver notifying the custom event has occurred and a particular behavior or action is desired on the computing system at block 304. Each of the devices may have a particular device driver operable to send instructions to the coupled device and receive interrupts from the device. As previously discussed, each of the device drivers may include an interrupt handling component to receive and process the interrupts from the coupled or connected devices.

At block 306, the interrupt handling component may generate a generic event message based on and in response to receiving the interrupt from the associated device. In some embodiments, the interrupt handling component may generate a generic event message having information to wake the computing system from a lower power state when the interrupt received from the device indicates that the desired behavior is to wake the computing system. The interrupt handling component may generate a generic event message to put the computing system into a lower power state when the interrupt received from the device indicates that the desired behavior is to put the computing system into a lower power state. The interrupt handling component may generate other types of generic event messages based on the interrupts received from the device and the desired behavior indicated by the interrupt.

In various embodiments, the interrupt handling component may send the generic event message to an attached advanced configuration and power interface (ACPI) device within the basic input/output system (BIOS) of a computing system at block 308. As previously discussed, each device for detecting or receiving custom events may be attached or coupled with a virtual ACPI device to communicate messages with the device and other components of the BIOS and hardware components of the computing system.

In various embodiments, the ACPI device may include an ACPI device driver including a generic event handling component. The generic event handling component may receive the generic event message from the device driver of the device. The generic event handling component may process the generic event message and generate a defined event message based on the generic event message at block 310. For example, the generic event handling component may generate a defined event message having information to wake the computing system from a lower power state based on the information in the generic event message. In another example, generic event handling component may generate a defined event message having information to put the computing system into a lower power state when the generic event message indicates that the desired behavior is to put the computing system into a lower power state.

The generic event handling component may send the defined event message to another ACPI device capable or operable to cause the desired behavior or system event to occur on the computing system at block 312. The ACPI device may be an event enabled ACPI device that has access and is configured to cause the desired behavior on the computing system. For example, the event enabled ACPI device may be a power button device operable to detect a pressing of or depressing of the button and to generate instructions or an interrupt to wake the computing system from a lower power state or put the computing system in a lower power state.

The event enabled ACPI device may include an event enabled ACPI device driver and defined event handling component. The defined event handling component may receive the defined event message from the generic event handling component and may process the defined event message. In particular, the defined event handling component may generate a system interrupt based on the defined event message at block 314. For example, the defined event handling component may generate a system interrupt to wake the computing system from a lower power state if the defined event message indicates that the desired behavior is to wake the computing system from the lower power state. In a second example, the defined event handling component may generate a system interrupt to put the computing system into a lower power state if the defined event message indicates that the desired behavior is to put the computing system into a lower power state.

The defined event handling component may send a system interrupt to an interrupt handler of an operating system of the computing system at block 316. In various embodiments, the defined event handling component may send or communicate the system interrupt via call to a method or function in the operating system. The interrupt handler may process the system interrupt at block 318. More specifically, the interrupt handler may invoke the desired behavior based on the system interrupt and the method called by the defined event handling component. For example, the interrupt handler may cause or initiate the computing system to exit or wake from a lower power state if the system interrupt indicates the desired behavior is to wake the computing system. In another example, the interrupt handler may put the computing system into a lower power state if the system interrupt indicates that the computing system it to be put to sleep. In some embodiments, the system interrupt may indicate that the computing system is to be put into a lower power state or wake from a lower power state by the method that is called by the system interrupt. In various embodiments, the interrupt handler may process the system interrupts and the operating system may execute or cause the desired behavior to occur. The computing system may then wait for another event including a custom event to occur for processing.

FIG. 4 illustrates an embodiment of logic flow 400. The logic flow 400 may be representative of some or all of the operations executed by one or more embodiments described herein. For example, the logic flow 400 may illustrate operations performed by the systems 100 and 200.

In the illustrated embodiment shown in FIG. 4, the logic flow 400 may include receiving an interrupt to cause an event on a platform processing device from a device not operative to directly cause the event on the platform processing device at block 405. More specifically, an interrupt handling component may receive an interrupt from a device. The device may generate an interrupt based on a detected or received custom event, as previously discussed and send or call a method of the interrupt handling component. The interrupt handling component may be part of a device driver associated with the device generating the interrupt.

At block 410, logic flow 400 may include generating a generic event message having information based on the interrupt and in response to receiving the interrupt. The interrupt handling component generating the generic event message having information to cause a system event, such as waking a computing system from a lower power state or putting a computing system in a lower power state based on the interrupt generated and the custom event.

The interrupt handling component may send the generic event message to a generic event handling component of an advanced configuration and power interface (ACPI) device driver for an ACPI device associated with or attached to the device. In some embodiments, the interrupt handling component may send the generic event message as a call to method or function of the generic event handling component.

The logic flow 400 may include generating a defined event message having information based on the information in the generic event message at block 415. In particular, the generic event handling component may generate the defined event message to cause the system event on a computing device based on the received generic event message or method called by the interrupt handling component. The defined event message may include information to cause the system event, such as waking a computing system from a lower power state or putting a computing system into a lower power state. The defined event message may be sent to a defined event handling component of an event enabled ACPI device driver. As previously discussed, the event enabled ACPI device and event enabled ACPI device driver are operative to cause the system event on a computing system.

At block 420, the logic flow 400 may include interrupting an operating system of the platform processing device to cause the event on the platform processing device based on information in the defined event message. For example, the defined event message may include information indicating that a wake event is desired based on the custom event and the defined event handling component may generate an interrupt to wake a computing system from a lower power state. In another example the defined event message may include information indicating that a sleep event is desired based on the custom event and the defined event handling component may generate an interrupt to put a computing system into a lower power state.

Figure 5:
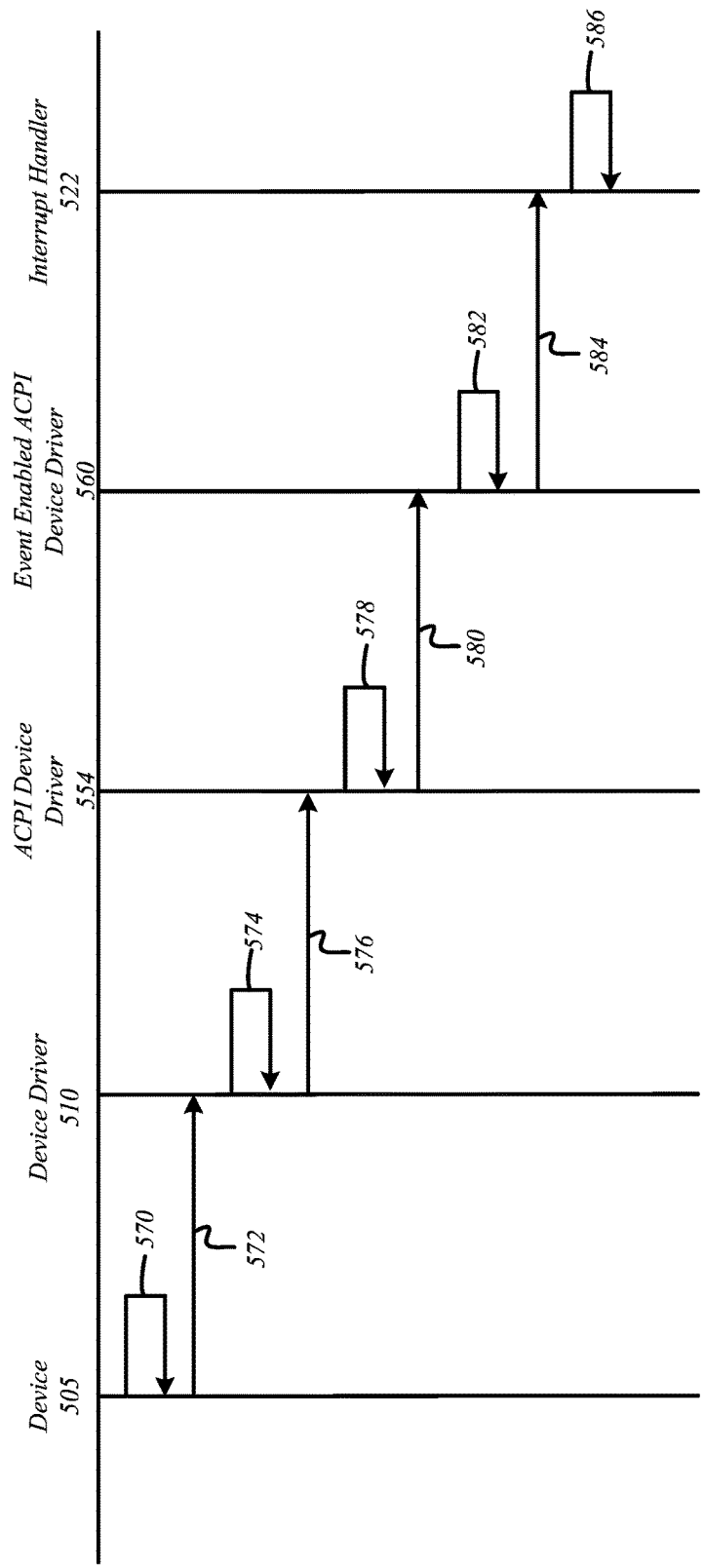
FIG. 5 illustrates a first signal diagram for processing a custom event.

FIG. 5 illustrates a first signal diagram 500 for processing a custom event through a computing system, such as computing system 100 of FIG. 1 and computing system 200 of FIG. 2. The first signal diagram 500 illustrates device 505, device driver 510, ACPI device driver 554, event enabled ACPI device driver 560 and interrupt handler 522. These components may the similar or the same as the corresponding liked named components as found in FIGS. 1 and 2.

In various embodiments, device 505 may receive or detect a custom event at line 570. The custom event may be any event that may be detected or received by a sensor, a device, or an interface such as a motion detection sensor, an accelerometer, a temperature sensor, a network interface device, a touch sensitive sensor, a microphone, a battery or power detection sensor, a light detection sensor, etc. In various embodiments, the custom event may be any event that is defined before or after a computing system coupled with device 505 has launched.

At line 572, the device 505 may communicate information to a device driver 510 associated with the device 505 that a custom event has been detected or received. In some embodiments, the device 505 may communicate the information via one or more signals one or more interconnects of a computing system coupling the device 505 with the device driver 510. In some instances, the device 505 may communicate the information via an interrupt over the one or more interconnects. However, various embodiments are not limited in this manner and the information may be communicated to the device driver 510 in any manner through any signal technique.

The device driver 510 may determine that the custom event is to invoke or cause a system event on a computing system based on the custom event and generate a generic event message at line 574. In various embodiments, the device driver 510 may determine if a system event such as a sleep event or wake event is to be invoked on the computing device. However, other system events may also be invoked on the computing system and various embodiments are not limited in this manner.

The generic event message may be generated and include information used to determine the system event to invoke on the computing system by other components of the computing device. The device driver 510 may communicate the generic event message to a coupled or attached ACPI device and ACPI device driver 554 at line 576. In some embodiments, the device driver 510 may communicate the generic event message via an interrupt call to a method or function of the ACPI device driver 554. For example, the device driver 510 may call a wake source method or function of the ACPI device driver 554 when the system event is a wake event or call a sleep source method or function of the ACPI device driver 554 when the system event is a sleep event. However, various embodiments are not limited in this manner and the device driver may communicate the generic event message through any signaling protocol used to communicate messages or notification between components of a computing system.

In some embodiments, the ACPI device driver 554 may generate a defined event message at line 578. The defined event message may include information indicating the system event is to be invoked on the computing system and may be based on information in the generic event message. In some embodiments, the information included in the defined event message may be based on the method or function called by the interrupt received from the device driver 510.

The ACPI device driver 554 may send the defined event message to an event enabled ACPI device and event enabled ACPI device driver 560 that is operable to directly cause the system event on the computing system at line 580. The defined event message may be sent to the event enabled ACPI device driver 560 via any communication messaging protocol through one or more interconnects of the computing system.

The event enabled ACPI device driver 560 may generate an interrupt to invoke the system event on the computing system based on the information in the defined event message at line 582. The interrupt may call a method or function in an operating system and handled by interrupt handler 522 at line 584. The interrupt may call a function based on the information in the defined event message to invoke the system event on the computing system. For example, the event enabled ACPI device driver 560 may call a method or function of the operating system to wake the computing system from a lower power state when the system event is a wake event and call a method or function of the operating system to put the computing system into a lower power state when the system event is a sleep event.

At line 586, the interrupt handler 522 may process the interrupt and the operating system may invoke the system event. For example, the operating system may cause the computing system to exit a lower power state when the system event is a wake event and may cause the computing system to enter a lower power state when the system event is a sleep event.

Figure 6:
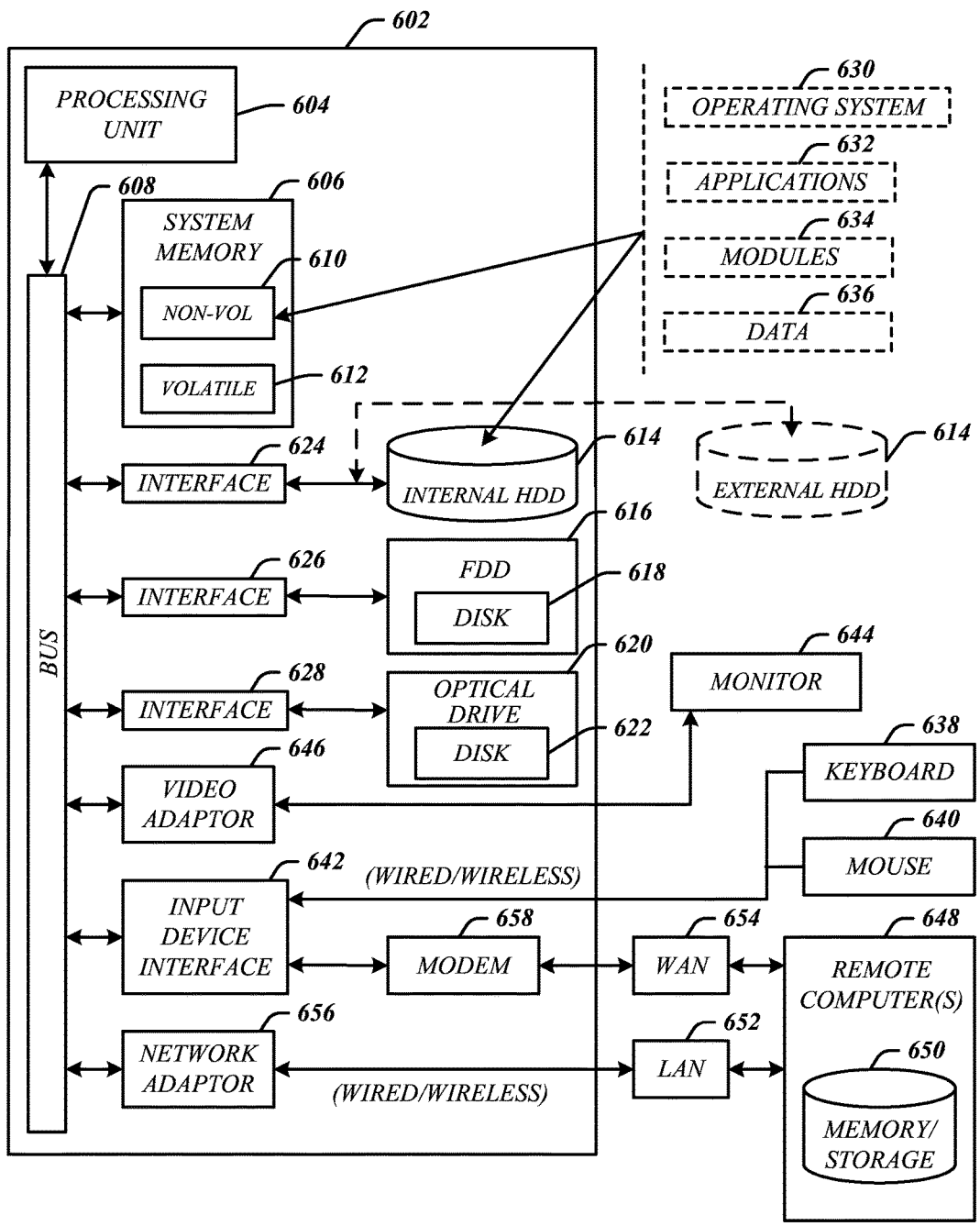
FIG. 6 illustrates an embodiment of a first computing architecture.

FIG. 6 illustrates an embodiment of an exemplary computing architecture 600 suitable for implementing various embodiments as previously described. In one embodiment, the computing architecture 600 may comprise or be implemented as part of computing device 100 and computing device 200.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

Figure 7:
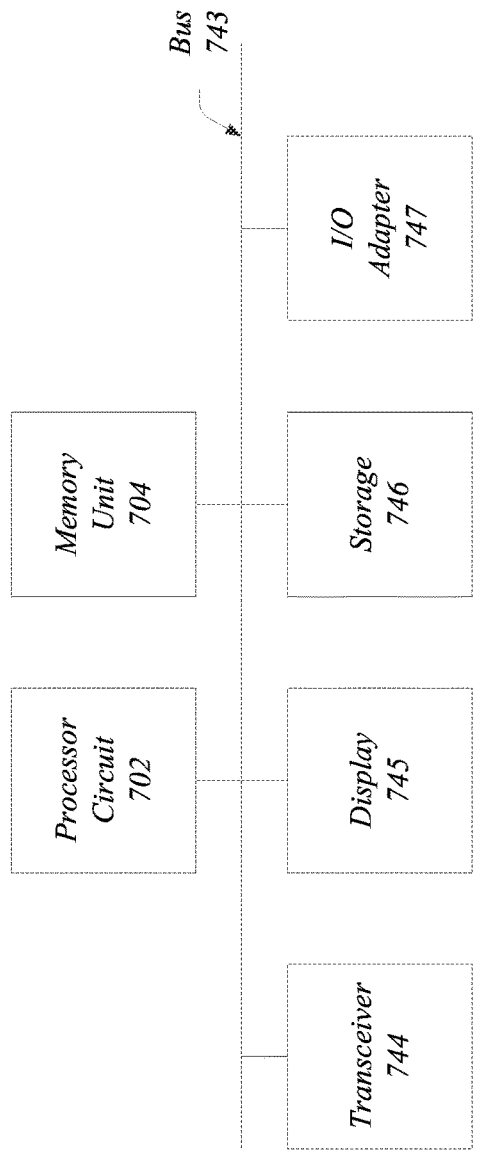
FIG. 7 illustrates an embodiment of a second computing architecture.

FIG. 7 illustrates one embodiment of a system 700. In various embodiments, system 700 may be representative of a system or architecture suitable for use with one or more embodiments described herein, such as computing system 100 of FIG. 1, computing system 200 of FIG. 2, logic flow 300 of FIG. 3, logic flow 400 of FIG. 4 and signaling 500 of FIG. 5. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor, processing circuitry or logic device.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory. In some embodiments, the machine-readable or computer-readable medium may include a non-transitory medium. The embodiments are not limited in this context.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, system 700 may include a display 745. Display 745 may constitute any display device capable of displaying information received from processor circuit 702.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

The detailed disclosure now turns to providing examples that pertain to further embodiments. Examples one through twenty-seven (1-27) provided below are intended to be exemplary and non-limiting.

Various embodiments are generally directed a system, device, apparatus and method for receiving an interrupt to cause a system event on a platform processing device from a device not operative to directly cause the system event on the platform processing device, generating a generic event message having information based on the interrupt and in response to receiving the interrupt. Moreover a defined event message may be generated having information based on the information in the generic event message and interrupt may be sent to an operating system of the platform processing device to cause the event on the platform processing device based on information in the defined event message.

In a first example, an apparatus or computing system may include a memory, a transceiver, processing circuitry, an interrupt handling component for execution on the processing circuitry to receive an interrupt to cause a system event on the apparatus from a device not operative to directly cause the system event, to generate a generic event message in response to receiving the interrupt and send the generic event message to a generic event handling component. The apparatus may also include the generic event handling component for execution on the processing circuitry to receive the generic event message, generate a defined event message in response to receiving the generic event message and to send the defined event message to a defined event handling component The apparatus may also include the defined event handling component for execution on the processing circuitry to receive the defined event message from the generic event handling component and to generate a system interrupt to cause the system event on the apparatus.

In a second example and in furtherance of the first example, an apparatus or computing system may include device to detect or receive a custom event comprising at least one of detecting a thermal condition above a thermal threshold, detecting a motion event, receiving an event message over an interface, and receiving a command through a microphone and the apparatus may include the interrupt handling component to receive the interrupt based on the device detecting or receiving the custom event.

In a third example and in furtherance of any of the previous examples, an apparatus or computing system may include the defined event handling component to send the system interrupt to cause the system event on the apparatus to an interrupt handler of an operating system, and the operating system to execute the system event on the apparatus.

In a fourth example and in furtherance of any of the previous examples, an apparatus or computing system may include the system event comprising a wake event or a sleep event, and the operating system to initiate exiting a lower power state for the apparatus when the system event is a wake event and to initiate putting the apparatus in a lower power state when the system event is a sleep event.

In a fifth example and in furtherance of any of the previous examples, an apparatus or computing system may include the generic event message and the defined event message including information used to determine whether the system event is a wake event or a sleep event, and the defined event handling component to generate the interrupt based on the information.

In a sixth example and in furtherance of any of the previous examples, an apparatus or computing system may include an advanced power and configuration interface (ACPI) compliant basic input/output system (BIOS) comprising an ACPI device and an event enabled ACPI device, the ACPI device to couple with the event enabled ACPI device and the device, and the event enabled ACPI device operative to directly cause the system event on the apparatus.

In a seventh example and in furtherance of any of the previous examples, an apparatus or computing system may include the ACPI device comprising an ACPI device driver comprising the generic event handling component and the event enabled ACPI device comprising an event enabled ACPI device driver comprising the defined event handling component to receive the defined event message from the generic event handling component.

In an eighth example and in furtherance of any of the previous examples, an apparatus or computing system may include the ACPI device comprising a virtual ACPI device to attach to the device and to provide an interface to the ACPI compliant BIOS and the event enabled ACPI device for the device.

In a ninth example and in furtherance of any of the previous examples, an apparatus or computing system may include the event enabled ACPI device comprising at least one of a power button device, a sleep button device, or a human interface device.

In a tenth example and in furtherance of any of the previous examples, a computer-implemented method may include receiving an interrupt to cause an event on a platform processing device from a device not operative to directly cause the system event on the platform processing device, generating a generic event message having information based on the interrupt and in response to receiving the interrupt, generating a defined event message having information based on the information in the generic event message and interrupting an operating system of the platform processing device to cause the system event on the platform processing device based on information in the defined event message.

In an eleventh example and in furtherance of any of the previous examples, a computer-implemented method may include detecting or receiving a custom event comprising at least one of detecting a thermal condition above a thermal threshold, detecting a motion event, receiving an event message over an interface, and receiving a command through a microphone.

In a twelfth example and in furtherance of any of the previous examples, a computer-implemented method may include communicating the system interrupt to cause the system event on the platform processing device to an interrupt handler of an operating system and executing the system event on the platform processing device.

In a thirteenth example and in furtherance of any of the previous examples, a computer-implemented method may include the system event comprising a wake event or a sleep event, and the method comprising initiating exiting a lower power state for the platform processing device when the system event is a wake event, and initiating putting the platform processing device in a lower power state when the system event is a sleep event.

In a fourteenth example and in furtherance of any of the previous examples, a computer-implemented method may include determining whether the system event is a wake event or a sleep based on information in a generic event message and a defined event message and generating the system interrupt based on the determination.

In a fifteenth example and in furtherance of any of the previous examples, a computer-implemented method may include associating an advanced configuration and power interface (ACPI) device with the platform processing device to provide an interface to an event enabled ACPI device operative to directly cause the system event on the platform processing device.

In a sixteenth example and in furtherance of any of the previous examples, an article comprising a computer-readable storage medium comprising a plurality of instructions that when executed enable a processor component to receive an interrupt to cause an event on a platform processing device from a device not operative to directly cause the system event on the platform processing device, generate a generic event message having information based on the interrupt and in response to receiving the interrupt, generate a defined event message having information based on the information in the generic event message and interrupt an operating system of the platform processing device to cause the system event on the platform processing device based on information in the defined event message.

In a seventeenth example and in furtherance of any of the previous examples, an article may include instructions that when executed enable the processor component to detect or receive a custom event comprising at least one of detecting a thermal condition above a thermal threshold, detecting a motion event, receiving an event message over an interface, and receiving a command through a microphone.

In an eighteenth example and in furtherance of any of the previous examples, an article may include instructions that when executed enable the processor component to communicate the system interrupt to cause the system event on the platform processing device to an interrupt handler of an operating system and execute the system event on the platform processing device In a nineteenth example and in furtherance of any of the previous examples, and event may include a wake event or a sleep event, and the article may include instructions that when executed enable the processor component to initiate exiting a lower power state for the platform processing device when the system event is a wake event, and initiate putting the platform processing device in a lower power state when the system event is a sleep event.

In a twentieth example and in furtherance of any of the previous examples, an article may include instructions that when executed enable the processor component to determine whether the system event is a wake event or a sleep based on information in a generic event message and a defined event message and generate the system interrupt based on the determination In a twenty-first example and in furtherance of any of the previous examples, an article may include instructions that when executed enable the processor component to associate an advanced configuration and power interface (ACPI) device with the platform processing device to provide an interface to an event enabled ACPI device operative to directly cause the system event on the platform processing device.

In a twenty-second example and in furtherance of any of the previous examples, an apparatus or device may include means for receiving an interrupt to cause a system event on a platform processing device from a device not operative to directly cause the system event on the platform processing device, means for generating a generic event message having information based on the interrupt and in response to receiving the interrupt, means for generating a defined event message having information based on the information in the generic event message and means for interrupting an operating system of the platform processing device to cause the system event on the platform processing device based on information in the defined event message.

In a twenty-third example and in furtherance of any of the previous examples, an apparatus may include means for detecting or receiving, by the device, a custom event comprising at least one of detecting a thermal condition above a thermal threshold, detecting a motion event, receiving an event message over an interface, and receiving a command through a microphone.

In a twenty-fourth example and in furtherance of any of the previous examples, an apparatus may include means for communicating the system interrupt to cause the system event on the platform processing device to an interrupt handler of an operating system and means for executing the system event on the platform processing device.

In a twenty-fifth example and in furtherance of any of the previous examples, the system event may include a wake event or a sleep event, and the apparatus may include means for initiating exiting a lower power state for the platform processing device when the system event is a wake event, and means for initiating putting the platform processing device in a lower power state when the system event is a sleep event.

In a twenty-sixth example and in furtherance of any of the previous examples, an apparatus may include means for determining whether the system event is a wake event or a sleep based on information in a generic event message and a defined event message and means for generating the system interrupt based on the determination.

In a twenty-seventh example and in furtherance of any of the previous examples, an apparatus may include means for associating an advanced configuration and power interface (ACPI) device with the platform processing device to provide an interface to an event enabled ACPI device operative to directly cause the system event on the platform processing device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    processing circuitry;
    an interrupt handling component for execution on the processing circuitry to receive an interrupt to cause a system event on the apparatus from a device not operative to directly cause the system event, to generate a generic event message in response to receiving the interrupt and send the generic event message to a generic event handling component;
    the generic event handling component for execution on the processing circuitry to receive the generic event message, generate a defined event message in response to receiving the generic event message and to send the defined event message to a defined event handling component; and
    the defined event handling component for execution on the processing circuitry to receive the defined event message from the generic event handling component and to generate a system interrupt and send the system interrupt to an interrupt handler of an operating system to cause the operating system to execute the system event on the apparatus.

2. The apparatus of claim 1, the device to detect or receive a custom event comprising at least one of detecting a thermal condition above a thermal threshold, detecting a motion event, receiving an event message over an interface, and receiving a command through a microphone; and the interrupt handling component to receive the interrupt based on the device detecting or receiving the custom event.

3. The apparatus of claim 1, the system event comprising a wake event or a sleep event, and the operating system to initiate exiting a lower power state for the apparatus when the system event is a wake event and to initiate putting the apparatus in a lower power state when the system event is a sleep event.

4. The apparatus of claim 3, the generic event message and the defined event message including information used to determine whether the system event is a wake event or a sleep event, and the defined event handling component to generate the interrupt based on the information.

5. The apparatus of claim 1, comprising:
    an advanced power and configuration interface (ACPI) compliant basic input/output system (BIOS) comprising an ACPI device and an event enabled ACPI device, the ACPI device to couple with the event enabled ACPI device and the device, and the event enabled ACPI device operative to directly cause the system event on the apparatus.

6. The apparatus of claim 5, the ACPI device comprising an ACPI device driver comprising the generic event handling component and the event enabled ACPI device comprising an event enabled ACPI device driver comprising the defined event handling component to receive the defined event message from the generic event handling component.

7. The apparatus of claim 5, the ACPI device comprising a virtual ACPI device to attach to the device and to provide an interface to the ACPI compliant BIOS and the event enabled ACPI device for the device.

8. The apparatus of claim 5, the event enabled ACPI device comprising at least one of a power button device, a sleep button device, or a human interface device.

9. A computer-implemented method, comprising:
    receiving an interrupt to cause a system event on a platform processing device from a device not operative to directly cause the system event on the platform processing device;
    generating a generic event message having information based on the interrupt and in response to receiving the interrupt;
    generating a defined event message having information based on the information in the generic event message;
    generating a system interrupt based on the defined event message; and
    communicating the system interrupt to an interrupt handler of an operating system of the platform processing device to cause the operating system to execute the system event on the platform processing device based on information in the defined event message.

10. The computer-implemented method of claim 9, comprising:
    detecting or receiving, by the device, a custom event comprising at least one of detecting a thermal condition above a thermal threshold, detecting a motion event, receiving an event message over an interface, and receiving a command through a microphone.

11. The computer-implemented method of claim 9, comprising:
    executing the system event on the platform processing device.

12. The computer-implemented method of claim 11, the system event comprising a wake event or a sleep event, and the method comprising initiating exiting a lower power state for the platform processing device when the system event is a wake event, and initiating putting the platform processing device in a lower power state when the system event is a sleep event.

13. The computer-implemented method of claim 12, comprising:
    determining whether the system event is a wake event or a sleep event based on information in a generic event message and a defined event message; and
    generating the system interrupt based on the determination.

14. The computer-implemented method of claim 9, comprising:
    associating an advanced configuration and power interface (ACPI) device with the platform processing device to provide an interface to an event enabled ACPI device operative to directly cause the system event on the platform processing device.

15. An article comprising a computer-readable storage medium containing a plurality of instructions that when executed enable a processor component to:
    receive an interrupt to cause a system event on a platform processing device from a device not operative to directly cause the system event on the platform processing device;
    generate a generic event message having information based on the interrupt and in response to receiving the interrupt;
    generate a defined event message having information based on the information in the generic event message;
    generate a system interrupt based on the defined event message; and
    communicate the system interrupt to an interrupt handler of an operating system of the platform processing device to cause the operating system to execute the system event on the platform processing device based on information in the defined event message.

16. The article of claim 15, comprising instructions that when executed enable the processor component to:
    process a custom event comprising at least one of detecting a thermal condition above a thermal threshold, detecting a motion event, receiving an event message over an interface, and receiving a command through a microphone.

17. The article of claim 15, comprising instructions that when executed enable the processor component to:
    execute the system event on the platform processing device.

18. The article of claim 15, the system event comprising a wake event or a sleep event, and the article comprising instructions that when executed enable the processor component to initiate exiting a lower power state for the platform processing device when the system event is a wake event, and initiate putting the platform processing device in a lower power state when the system event is a sleep event.

19. The article of claim 18, comprising instructions that when executed enable the processor component to:
    determine whether the system event is a wake event or a sleep event based on information in a generic event message and a defined event message; and
    generate the system interrupt based on the determination.

20. The article of claim 15, comprising instructions that when executed enable the processor component to:
    associate an advanced configuration and power interface (ACPI) device with the platform processing device to provide an interface to an event enabled ACPI device operative to directly cause the system event on the platform processing device.

* * * * *